US008915813B2

(12) United States Patent
Liebherr et al.

(10) Patent No.: US 8,915,813 B2
(45) Date of Patent: Dec. 23, 2014

(54) CONTINUOUSLY VARIABLE HYDROSTATIC TRANSMISSION HAVING TORQUE DIVISION

(75) Inventors: Markus Liebherr, Ennetbaden (CH); Peter Dziuba, Frickingen-Altheim (DE); Josef Häglsperger, Gangkofen (DE)

(73) Assignee: MALI Holding AG, Wettingen (CH)

(*) Notice: Subject to any disclaimer, the term of this patent is extended or adjusted under 35 U.S.C. 154(b) by 512 days.

(21) Appl. No.: 13/148,920

(22) PCT Filed: Jan. 25, 2010

(86) PCT No.: PCT/EP2010/000404
§ 371 (c)(1),
(2), (4) Date: May 29, 2012

(87) PCT Pub. No.: WO2010/091778
PCT Pub. Date: Aug. 19, 2010

(65) Prior Publication Data
US 2012/0231914 A1 Sep. 13, 2012

(30) Foreign Application Priority Data
Feb. 12, 2009 (CH) .......................................... 211/09

(51) Int. Cl.
*F16H 3/72* (2006.01)
*F16H 47/04* (2006.01)
*F16H 37/08* (2006.01)
*F16H 39/00* (2006.01)

(52) U.S. Cl.
CPC ........ *F16H 47/04* (2013.01); *F16H 2037/0866* (2013.01); *F16H 2039/005* (2013.01); *F16H 2200/2005* (2013.01)
USPC ................................................ 475/1; 475/72

(58) Field of Classification Search
USPC ........................................ 475/1, 6, 72, 74, 78
See application file for complete search history.

(56) References Cited

U.S. PATENT DOCUMENTS 2,931,250 A 4/1960 Ebert
3,503,281 A * 3/1970 Gsching et al. .................. 475/32
(Continued)

FOREIGN PATENT DOCUMENTS

DE 1 755 161 4/1970
DE 23 35 629 1/1975
(Continued)

OTHER PUBLICATIONS

K. Th. Renius, "Hydrostatische Fahrantriebe fur mobile Arbeitsmaschinen," URL: http://www.baumaschine.de/Portal/Archive/1_2004/Wissenschaft/fahrantriebe/fahran, 2004 (15 pages) XP-002545590.

(Continued)

*Primary Examiner* — Edwin A Young
(74) *Attorney, Agent, or Firm* — Pauley Petersen & Erickson

(57) ABSTRACT

A continuously variable hydrostatic transmission (10) having torque division for a vehicle comprises a first hydrostatic unit (H1) operating as a pump and a second hydrostatic unit (H2) operating as a motor, and further a planetary drive (12), a first shaft (W1) on the drive side and a summing means (W6). The power present at the first shaft (W1) is divided by way of the planetary drive (12) to a mechanical transmission branch (Z9, W2, Z1, Z2) and a hydraulic transmission branch (Z7, W3, Z4, Z5, Z6, H1, H2) formed by the two hydraulically coupled hydrostatic units (H1, H2) and is combined again at the summing means (W6). In such a transmission, a compact and simplified design and great flexibility in application are achieved in that the power transmission between the first shaft (W1) and summing means (W6) can be controlled exclusively by varying the displacements of the hydrostatic units (H1, H2).

17 Claims, 10 Drawing Sheets

(56) References Cited

U.S. PATENT DOCUMENTS

| | | | |
|---|---|---|---|
| 4,446,756 A | | 5/1984 | Hagin et al. |
| 5,211,610 A | * | 5/1993 | Hurth ................................ 475/1 |
| 6,039,666 A | | 3/2000 | Okuda et al. |
| 2004/0173089 A1 | | 9/2004 | Gray, Jr. et al. |

FOREIGN PATENT DOCUMENTS

| | | |
|---|---|---|
| DE | 27 58 300 | 7/1979 |
| DE | 29 04 572 | 8/1980 |
| DE | 29 50 619 | 6/1981 |
| DE | 37 07 382 | 9/1988 |
| DE | 37 26 080 | 2/1989 |
| DE | 39 12 369 | 10/1990 |
| DE | 39 12 386 | 10/1990 |
| DE | 43 43 401 | 4/1994 |
| DE | 43 43 402 | 4/1994 |
| DE | 198 33 711 | 2/2000 |
| DE | 100 44 784 | 4/2002 |
| EP | 0 249 001 | 12/1987 |
| EP | 0 562 594 | 9/1993 |
| EP | 0 976 912 A2 | 2/2000 |
| EP | 1 273 828 A | 1/2003 |
| GB | 1222323 | 2/1971 |
| JP | 63-167172 | 7/1988 |
| JP | 64-87945 | 4/1989 |
| JP | 10-205606 | 8/1998 |
| JP | 2000-18367 | 1/2000 |
| JP | 2008-39015 | 2/2008 |
| WO | WO 2006/042434 A1 | 4/2006 |

OTHER PUBLICATIONS

H. Bork et al., "Modellbildung, Simulation and Analyse eines stufenlosen leistungsverzweigten Traktorgetriebes," URL: http://www.amm.mw.tu-muenchen.de/Research/Publikationen/ Paper /bork/tr aktorbork.pdf (19 pages), 2000.

\* cited by examiner

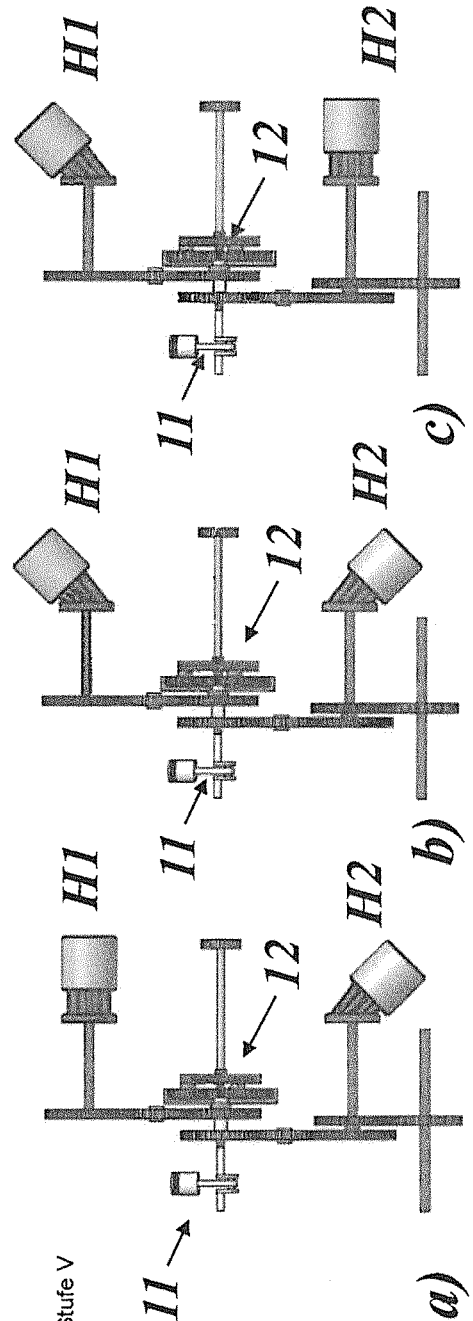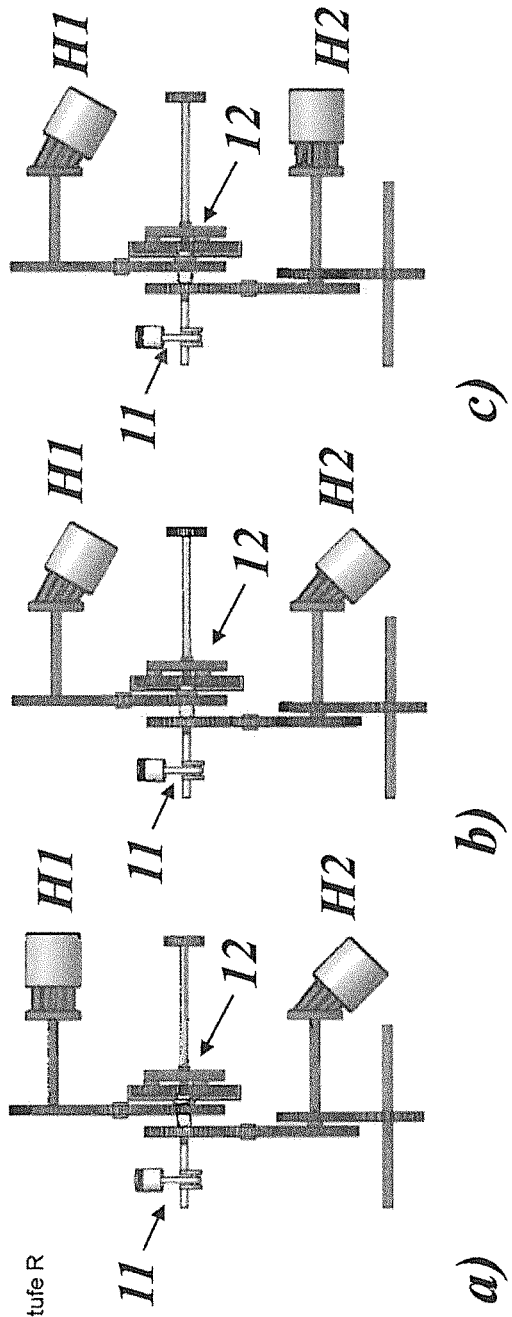

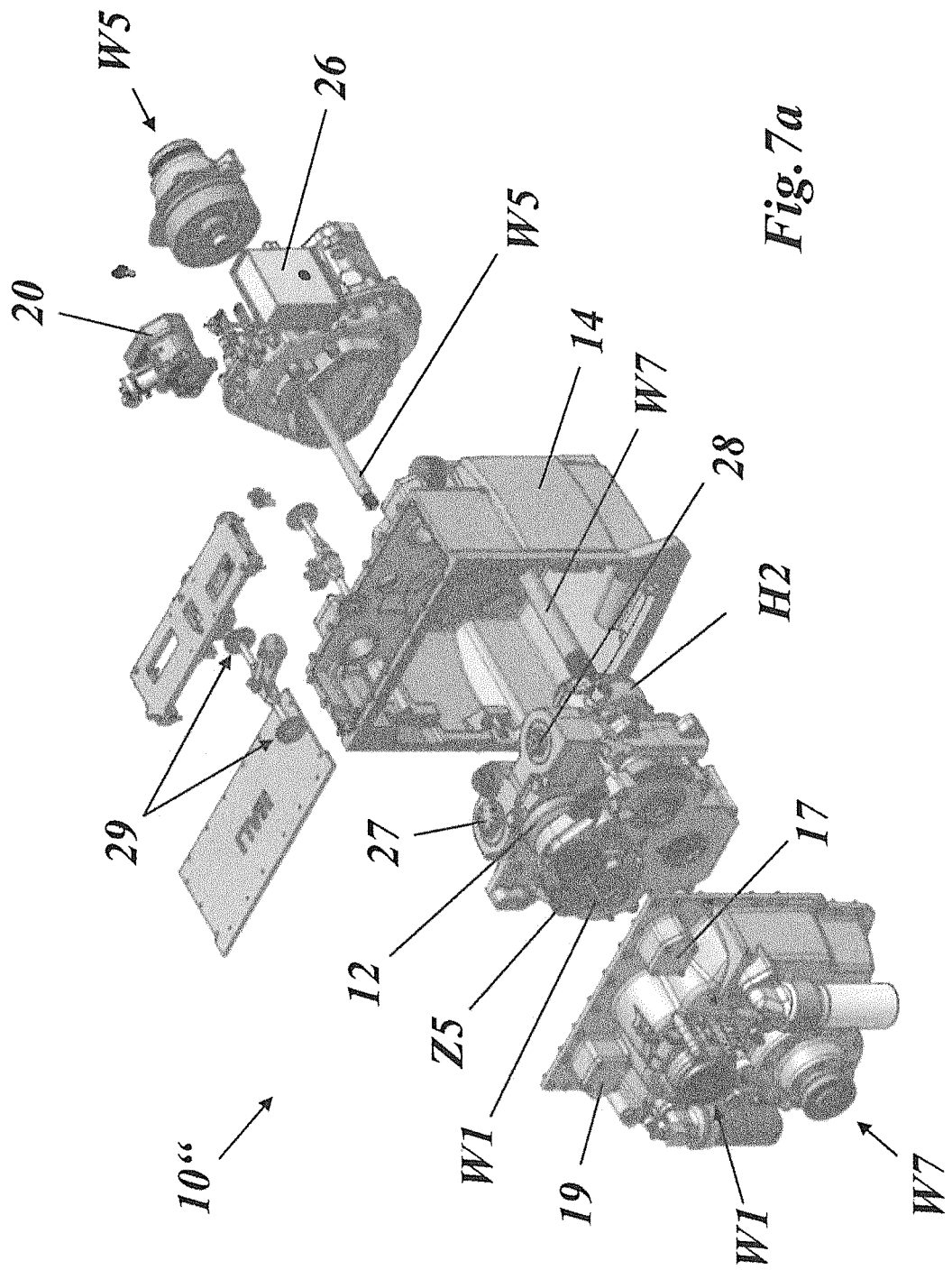

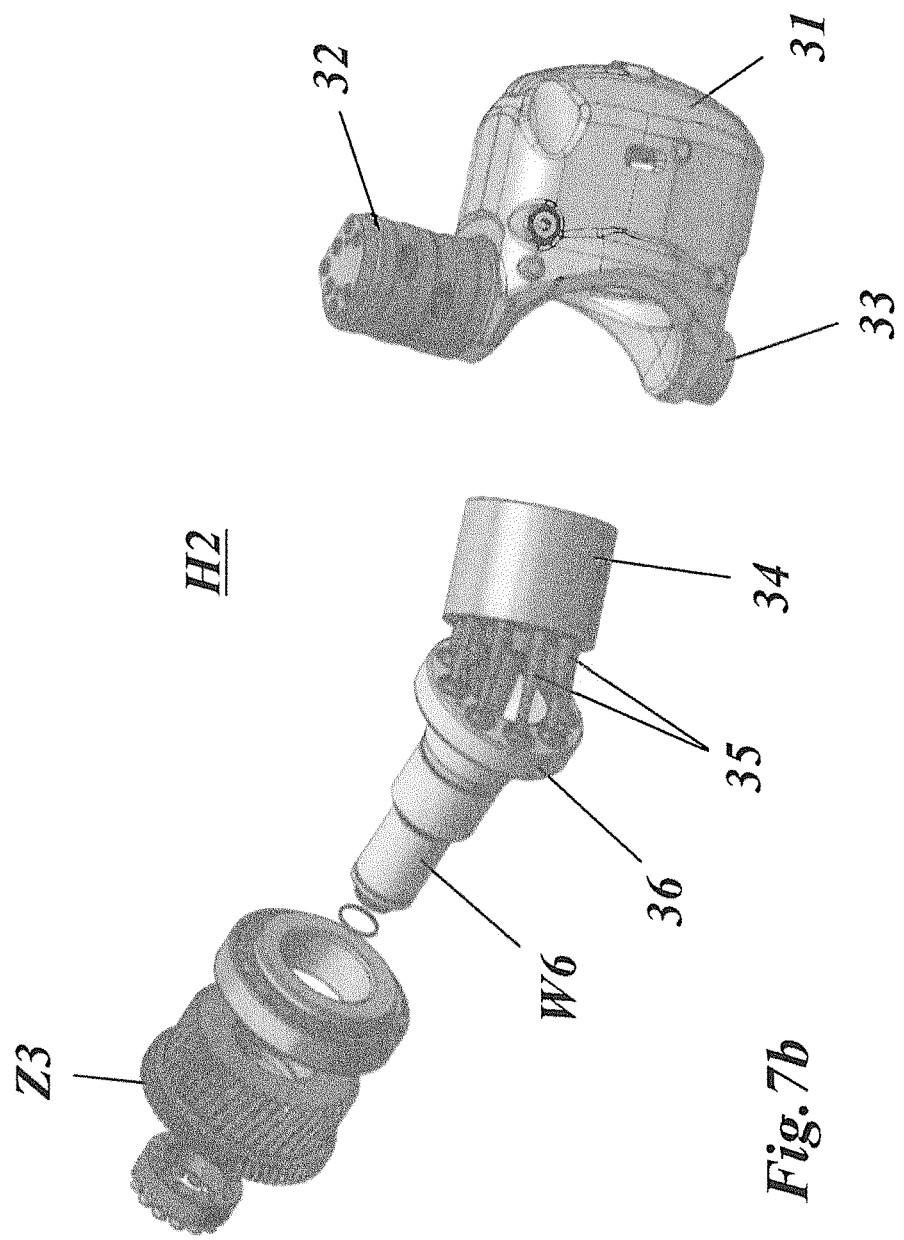

CONTINUOUSLY VARIABLE HYDROSTATIC TRANSMISSION HAVING TORQUE DIVISION

BACKGROUND OF THE INVENTION

1. Field of the Invention

The present invention relates to the sector of continuously variable hydrostatic transmissions with torque division. It relates to a transmission of this kind in accordance with the preamble of claim 1.

2. Discussion of Related Art

Torque-split transmissions, especially for use on agricultural or construction vehicles such as tractors, have long been known. In such torque-split transmissions, the power present at an input shaft or drive-input shaft, which is generally output by an internal combustion engine, is divided between a first, mechanical power branch with a fixed transmission ratio and a second power branch with a continuously variable transmission ratio and is then combined again so as to be available at an output shaft or drive-output shaft. The second power branch is generally designed as a hydrostatic branch, in which two hydrostatic axial-piston machines (hydrostatic units) of the oblique-axis or swashplate type, which are hydraulically interconnected, operate optionally as a pump or a motor. Here, the transmission ratio can be varied by changing the pivoting angle of the cylinder block or of the swashplate. Dividing the power between the two power branches and combining the divided powers is generally performed by means of a planetary transmission. Various embodiments of torque-split transmissions of the type described are disclosed in DE-A1-27 58 300, DE-C2-29 04 572, DE-A1-29 50 619, DE-A1-37 07 382, DE-A1-37 26 080, DE-A1-39 12 369, DE-A1-39 12 386, DE-A1-43 43 401, DE-A1-43 43 402, EP-B1-0 249 001 and EP-A2-1 273 828.

In order to be able to use a torque-split transmission successfully in practice, it should in general terms be distinguished by the following characteristics:

- The transmission should have a high efficiency over the entire speed range. This should be the case especially at the high speeds of travel that occur over long periods in road traffic.
- The transmission should be of compact construction to enable it to be installed in a very wide variety of vehicles, if possible without any design limitations.
- The transmission should allow full electronic control in conjunction with the engine management system and should provide emergency running programs that are adequate even if certain control elements fail.
- The transmission should allow high powers to be transmitted.
- The construction of the transmission should be as simple as possible in order to limit power losses and increase reliability of operation.
- The transmission should allow full electronic control in conjunction with the engine management system and should provide emergency running programs that are adequate even if certain control elements fail.

DE-A1-43 43 402, which was mentioned at the outset, has already described a continuously variable hydrostatic torque-split transmission (referred to in German as an SHL-Getriebe (Stufenloses Hydrostatisches Leistungsverzweigungsgetriebe)) which is distinguished by two hydraulically coupled oblique-axis hydrostatic units of the same type which can be coupled in different ways to a planetary differential transmission by way of clutch pairs or selector elements K1/K2 and K3/K4 respectively. The known continuously variable hydrostatic torque-split transmission has been used and tested in city buses under the type designation SHL-Z. The two hydrostatic units employed have a pivoting range of just 0-25°. For forward travel, this gives 3 drive positions or drive ranges: in the first drive range, the hydrostatic component of the power transmitted is 100% at the starting point and then decreases linearly with speed toward zero. In the second drive range, it goes from zero to a maximum of about 27% and then falls back to zero again. In the third drive range, it goes from zero to a maximum value of 13% at the maximum forward speed.

The hydrostatic power transmission branch in such a transmission generally comprises two hydrostatic axial-piston machines, which are connected to one another hydraulically and of which one operates as a pump and the other as a motor. The two machines can swap roles depending on the drive position.

The hydrostatic axial-piston machines form a significant part of the hydrostatic torque-split transmission and have a decisive effect on the characteristics of the transmission, such as efficiency, overall size, complexity, the speed range covered, the type and number of drive positions and the like. Examples of hydrostatic axial-piston machines of this kind are disclosed in DE-A1-198 33 711, DE-A1-100 44 784 or US-A1-2004/0173089. The mode of operation and theory of hydrostatic axial-piston machines and of a torque-split tractor transmission fitted therewith are described in a publication by the Technical University of Munich from the year 2000 by H. Bork et al., entitled "Modellbildung, Simulation and Analyse eines stufenlosen leistungsverzweigten Traktorgetriebes" [Modeling, Simulation and Analysis of a Continuously Variable Torque-split Tractor Transmission].

Finally, WO-A1-2006/042434 has disclosed a continuously variable hydrostatic torque-split transmission which operates with two large-angle hydrostatic units with a pivoting range of up to 50°. The overall speed range of the transmission is divided into two sections, in which the two hydrostatic units swap roles as pump and motor. For the switchover between the two sections, two dual clutches are provided, by means of which the hydrostatic units are connected in different ways to the torque-splitting planetary drive. With this transmission, it is possible to cover a large speed range in a continuously variable manner while achieving high efficiency at the same time. However, it is of relatively large size because space is required for the switchable connections involving the dual clutches.

SUMMARY OF THE INVENTION

It is therefore an object of the invention to provide a comparable transmission which is of particularly compact size, is distinguished by greater simplicity of construction and can be adapted in a modular fashion to different vehicle requirements, and to specify a method for operating the same.

The object is achieved by the features of claims 1 and 16 in their entirety. The transmission according to the invention comprises a first hydrostatic unit operating as a pump and a second hydrostatic unit operating as a motor, and further comprises a planetary drive, a first shaft on the drive-input side and a summing means, wherein the power present at the first shaft is divided by way of the planetary drive between a mechanical transmission branch and a hydraulic transmission branch formed by the two hydraulically coupled hydrostatic units and is combined again at the summing means. It is distinguished by the fact that power transmission between the first shaft and the summing means can be controlled exclusively by varying the displacements of the hydrostatic units.

A first embodiment of the invention is distinguished by the fact that the displacements of the two hydrostatic units can be varied by means of a pivoting process, and in that the two hydrostatic units are designed as large-angle hydrostatic units with a pivoting range of at least approximately 45°. It is thereby possible to achieve a speed range of up to approximately 50 km/h.

The second hydrostatic unit can preferably be pivoted to at least one side by at least approximately 45°, and the first hydrostatic unit can be pivoted to one side by at least approximately 45° and to the other side by at least approximately 30°. Continuously variable reverse travel is thereby made possible in a simple manner.

The hydrostatic units are preferably designed as axial-piston oblique-axis hydrostatic units.

Another embodiment of the invention is distinguished by the fact that the second hydrostatic unit has a significantly larger maximum displacement than the first hydrostatic unit. It is possible to achieve a particularly high tractive effort from the vehicle by virtue of the fact that the maximum displacement of the second hydrostatic unit is approximately twice the maximum displacement of the first hydrostatic unit. In particular, the maximum displacement of the first hydrostatic unit is approximately 160 $cm^3$.

According to another embodiment of the invention, the summing means is a summing shaft.

Another embodiment of the invention is distinguished by the fact that the hydrostatic units are arranged parallel to one another and to the first shaft. In particular, the two hydrostatic units can be arranged adjacent to one another in relation to the direction of the first shaft, preferably in a horizontal plane.

However, it is also conceivable that the two hydrostatic units be arranged coaxially in series and as a mirror image of one another in relation to the direction of the first shaft, that the planetary drive be arranged ahead of the two hydrostatic units in the axial direction and the summing means be arranged after the two hydrostatic units in the axial direction, and that the planetary drive and the summing means be operatively connected by a shaft extending in the axial direction above the two hydrostatic units. This special arrangement makes it possible to implement a low-slung cab floor reaching down between the planetary drive and the summing means to a position close to the shaft between the planetary drive and the summing means, particularly when using the transmission in small tractors.

Another embodiment is distinguished by the fact that the planetary drive comprises a central sun wheel and an annulus concentrically surrounding the sun wheel and further comprises planet wheels arranged between said sun wheel and annulus and rotatably mounted on a planet spider, that the planet spider is connected to the first shaft for conjoint rotation, that the annulus is operatively connected to the first hydrostatic unit, and that the sun wheel is operatively connected to the second hydrostatic unit.

According to another embodiment, the first shaft extends through the planetary drive and is designed as a power takeoff shaft on the opposite side from the drive input.

According to another embodiment of the invention, the summing means is operatively connected to a second shaft for driving the rear and/or front axle and, in particular, the drive for the front axle can be selectively engaged by way of a clutch.

The method according to the invention for operating the transmission is characterized in that, to implement a continuously variable forward drive range, the displacement of the first hydrostatic unit is first of all set to zero and the displacement of the second hydrostatic unit is set to the maximum before starting, in that, in an initial phase, the displacement of the second hydrostatic unit is held at the maximum and the displacement of the first hydrostatic unit is increased in the direction of forward travel until it reaches its maximum in the direction of forward travel, and in that, in a second phase, the displacement of the first hydrostatic unit is held at the maximum and the displacement of the second hydrostatic unit is reduced from the maximum to zero.

One embodiment of the method according to the invention is distinguished by the fact that, to implement a continuously variable reverse drive range, the displacement of the first hydrostatic unit is first of all set to zero and the displacement of the second hydrostatic unit is set to the maximum before starting, that, in an initial phase, the displacement of the second hydrostatic unit is held at the maximum and the displacement of the first hydrostatic unit is increased in the direction of reverse travel until it reaches its maximum in the direction of reverse travel, and that, in a second phase, the displacement of the first hydrostatic unit is held at the maximum and the displacement of the second hydrostatic unit is reduced from the maximum to zero.

BRIEF DESCRIPTION OF THE DRAWINGS

The invention will be explained in greater detail below with reference to illustrative embodiments in conjunction with the drawing, in which

FIG. 2 shows the adjustment of the hydrostatic units over the forward drive range of the transmission shown in FIG. 1, in a number of subsidiary figures (a) to (c);

FIG. 3 shows the adjustment of the hydrostatic units over the reverse drive range of the transmission shown in FIG. 1, in a number of subsidiary figures (a) to (c);

FIG. 7a shows the internal construction of the transmission in FIG. 7 in an exploded perspective view;

FIG. 7b shows, by way of example, the construction of the second hydrostatic unit H2 in FIG. 7a, which is connected to shaft W6;

DESCRIPTION OF PREFERRED EMBODIMENTS

Figure 1:
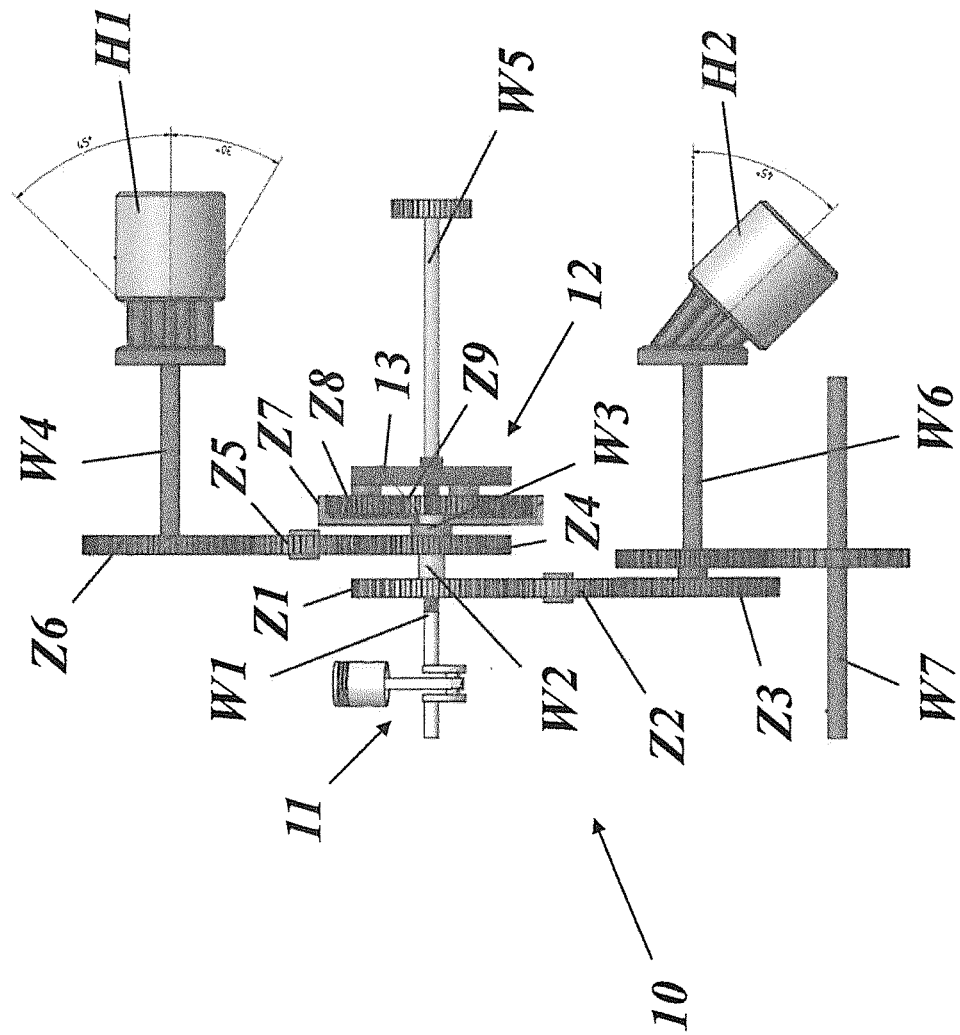
FIG. 1 shows the basic layout of a continuously variable hydrostatic transmission having torque division in accordance with a first preferred illustrative embodiment of the invention.

FIG. 1 shows the basic layout of a continuously variable hydrostatic transmission having torque division in accordance with a first preferred illustrative embodiment of the invention. The transmission 10 transmits the power of an internal combustion engine 11, represented symbolically by a piston, to a shaft W7, which, as a drive output shaft, carries the power to the rear axle and/or front axle of a vehicle. The transmission 10 comprises two power branches, namely a mechanical power branch and a hydraulic power branch. Depending on the drive range, the power available at the input is divided in different ways between the two branches, the mechanical branch being invariable and the hydrostatic branch being variable.

Significant parts of the transmission 10 include a planetary drive 12 with a central sun wheel Z9, revolving planet wheels Z8 and an annulus Z7 concentrically surrounding the planet wheels Z8, a first large-angle hydrostatic unit H1 with a positive pivoting range of approximately 45° and a negative pivoting range of approximately 30°, a second large-angle hydrostatic unit H2 with a unilateral pivoting range of approximately 45°, and a summing shaft W6, at which the powers of the two branches are combined again. The two hydrostatic units H1 and H2 are arranged to the left and to the right of a first shaft W1 with their axes of rotation parallel to said shaft. The first shaft W1, which acts as a drive-input shaft, couples the power of the internal combustion engine 11 into the transmission 10. It extends through the planetary drive 12 and is available as a power takeoff shaft W5 on the other side of the transmission for driving external appliances.

A planet spider 13, which carries the planet wheels Z8, is seated on the first shaft W1 for conjoint rotation. The central sun wheel Z9 is connected by a first hollow shaft W2 for conjoint rotation to a gearwheel Z1, which transmits the rotation via a first idler gearwheel Z2 to a gearwheel Z3 on the summing shaft W6. The summing shaft W6 is connected directly to the second hydrostatic unit H2. The annulus Z7 is connected by a second hollow shaft W3 for conjoint rotation to a gearwheel Z4, transmits the rotation via a second idler gearwheel Z5 to a gearwheel Z6 on shaft W4. Shaft W4 is coupled directly to the first hydrostatic unit H1. Although this is not illustrated in the drawing, the two hydrostatic units H1 and H2 are connected to each other hydraulically, with the result that the hydraulic fluid pumped by the first hydrostatic unit H1, which is operating as a pump, passes to the second hydrostatic unit H2, which is operating as a motor, and drives the latter.

At the planetary drive 12, the power coupled into the transmission 10 branches: the mechanical power branch is formed by the sun wheel Z9, the first hollow shaft W2 and gearwheels Z1, Z2 and Z3. The hydraulic power branch is formed by the annulus Z7, the second hollow shaft W3, gearwheels Z4, Z5 and Z6 and the two hydraulically connected hydrostatic units H1 and H2. The powers from the two branches, which are summed at the summing shaft W6, are transmitted to the drive-output shaft W7 by a gear mechanism.

By means of the transmission 10 in FIG. 1, a continuously variable forward drive range and a continuously variable reverse drive range can be implemented. The associated adjustments of the hydrostatic units are reproduced in FIG. 2 (forward drive range or F position) and FIG. 3 (reverse drive range or R position). In both cases, the drive range begins with the stationary condition shown in FIG. 2a) and FIG. 3a) respectively, in which the first hydrostatic unit H1 is unpivoted and hence has a negligible displacement, while the second hydrostatic unit H2 is fully pivoted (by approximately) 45° and has the maximum displacement. For starting in the case of forward travel (FIG. 2), pivoting is out toward the upper side, which is associated with forward motion, as a result of which the vehicle picks up speed. The maximum deflection of the second hydrostatic unit H2 ensures a high torque (high tractive effort) for a low speed of rotation. Once the first hydrostatic unit H1 is fully deflected (FIG. 2b), it is held there, and the second hydrostatic unit H2 is pivoted back inward to the zero position (negligible displacement) (FIG. 2c). The decreasing displacement in the second hydrostatic unit H2 ensures an ever increasing speed of rotation as the torque decreases.

Figure 4:
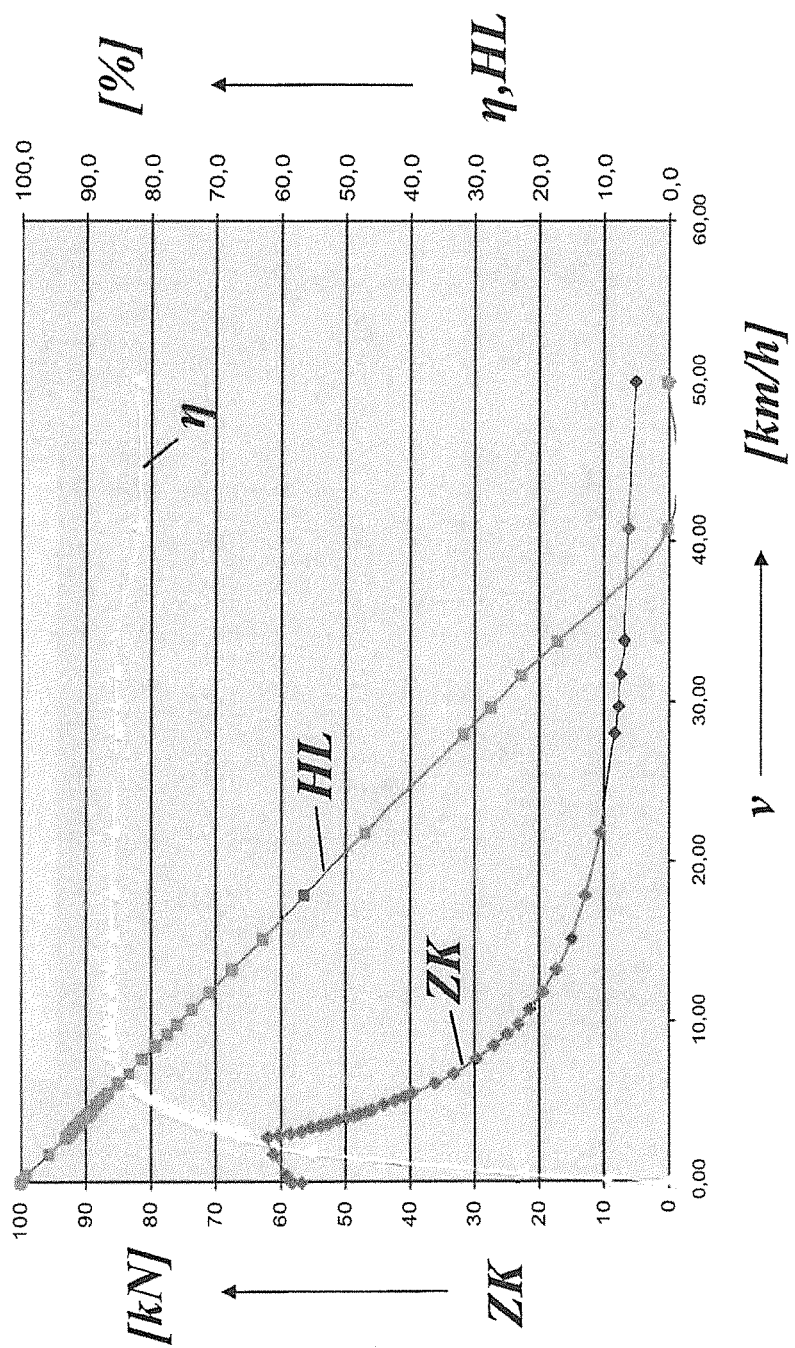
FIG. 4 shows the curves for the tractive effort (ZK), efficiency ($\eta$) and hydrostatic power component (HL) of the transmission shown in FIG. 1 against speed for a first size of the hydrostatic units.
Figure 5:
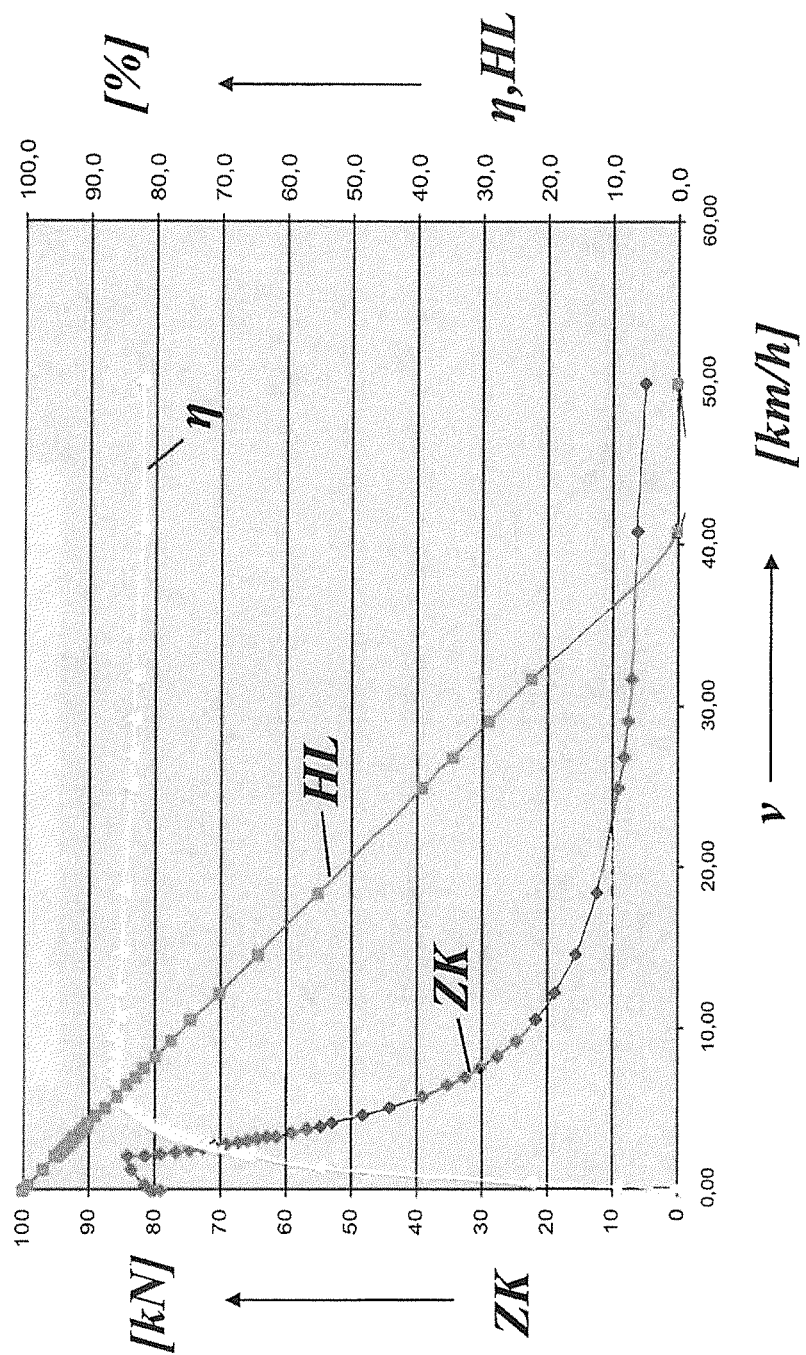
FIG. 5 shows the curves for the tractive effort (ZK), efficiency ($\eta$) and hydrostatic power component (HL) of the transmission shown in FIG. 1 against speed for a second size of the hydrostatic units.

In FIG. 4, the tractive effort ZK, the hydrostatic power component HL of the power transmitted and the efficiency η of the transmission are plotted against the speed v for a transmission in accordance with FIG. 1 for forward travel in accordance with FIG. 2. The illustrative transmission transmits a power of 90 kW. The vehicle reaches a speed of 50 km/h at a speed of 2200 rpm of the internal combustion engine 11. In this case, the pumping hydrostatic unit H1 has a maximum displacement of 160 cm$^3$ and the hydrostatic unit H2 operating as a motor has a maximum displacement of 233 cm$^3$. It can be seen that the efficiency in the important driving range of 5 to 50 km/h is significantly above 80% and that a maximum tractive effort ZK of over 60 kN is achieved at low speeds. The proportion of the power transmitted accounted for by the hydraulic power branch decreases in a linear manner from 100% in the stationary condition to 0% at a speed of 40 km/h. An even higher maximum tractive effort ZK of over 80 kN can be achieved in accordance with FIG. 5, other conditions remaining the same, if the second hydrostatic unit H2 has an even greater maximum displacement of 325 cm$^3$, this being approximately twice as great as the displacement of the first hydrostatic unit H1.

During reverse travel in accordance with FIG. 3, the starting point is the same stationary configuration (FIG. 3a) as for forward travel. For starting, however, the first hydrostatic unit H1 is pivoted in the opposite direction until it has reached its maximum deflection (30° in the example) (FIG. 3b). The fully deflected second hydrostatic unit H2 is then pivoted back into the zero position (FIG. 3c).

Figure 6:
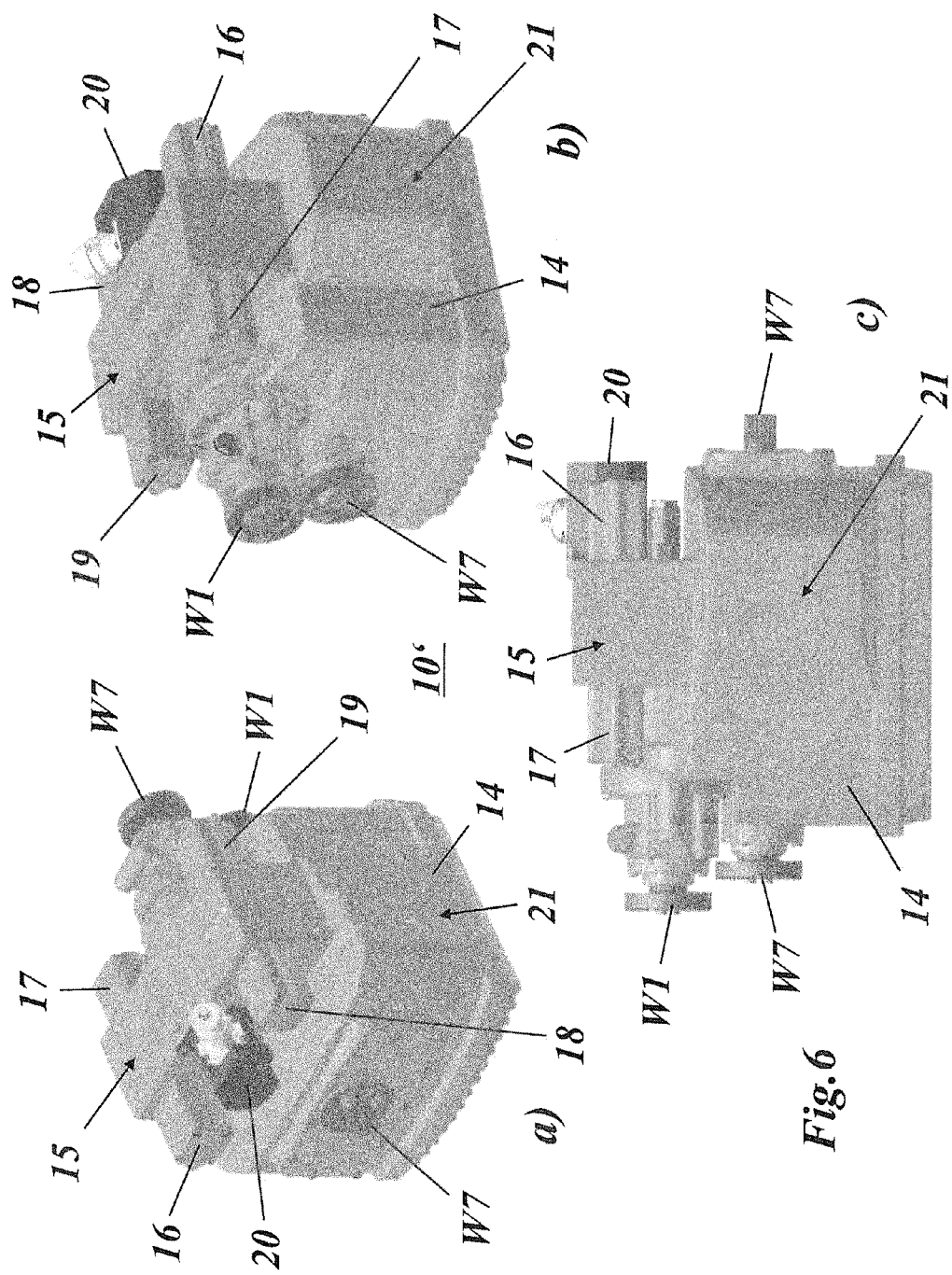
FIG. 6 shows a first complete transmission of the type illustrated in FIG. 1 in a number of views.

In FIG. 6, a complete transmission 10' with the basic construction in accordance with FIG. 1 is depicted in various views. The transmission 10' is accommodated in a housing 14, from which the drive-input shaft W1 projects forward and the drive-output shaft W7 projects forward and rearward. The two hydrostatic units H1 and H2 are arranged horizontally on both sides of the drive-output shaft W7 and can be pivoted in a range that can be ascertained from protrusions 21 in the housing 14. Provided on the upper side of the housing 1 is an adjusting unit 15 having two pairs of opposite hydraulic cylinders 16, 17 and 18, 19, by means of which the hydrostatic units H1, H2, which can be pivoted about a vertical pivot axis, can be adjusted. The hydraulic adjustment is controlled by means of a control unit 20, which is arranged on the side of the adjusting unit 15.

Figure 7:
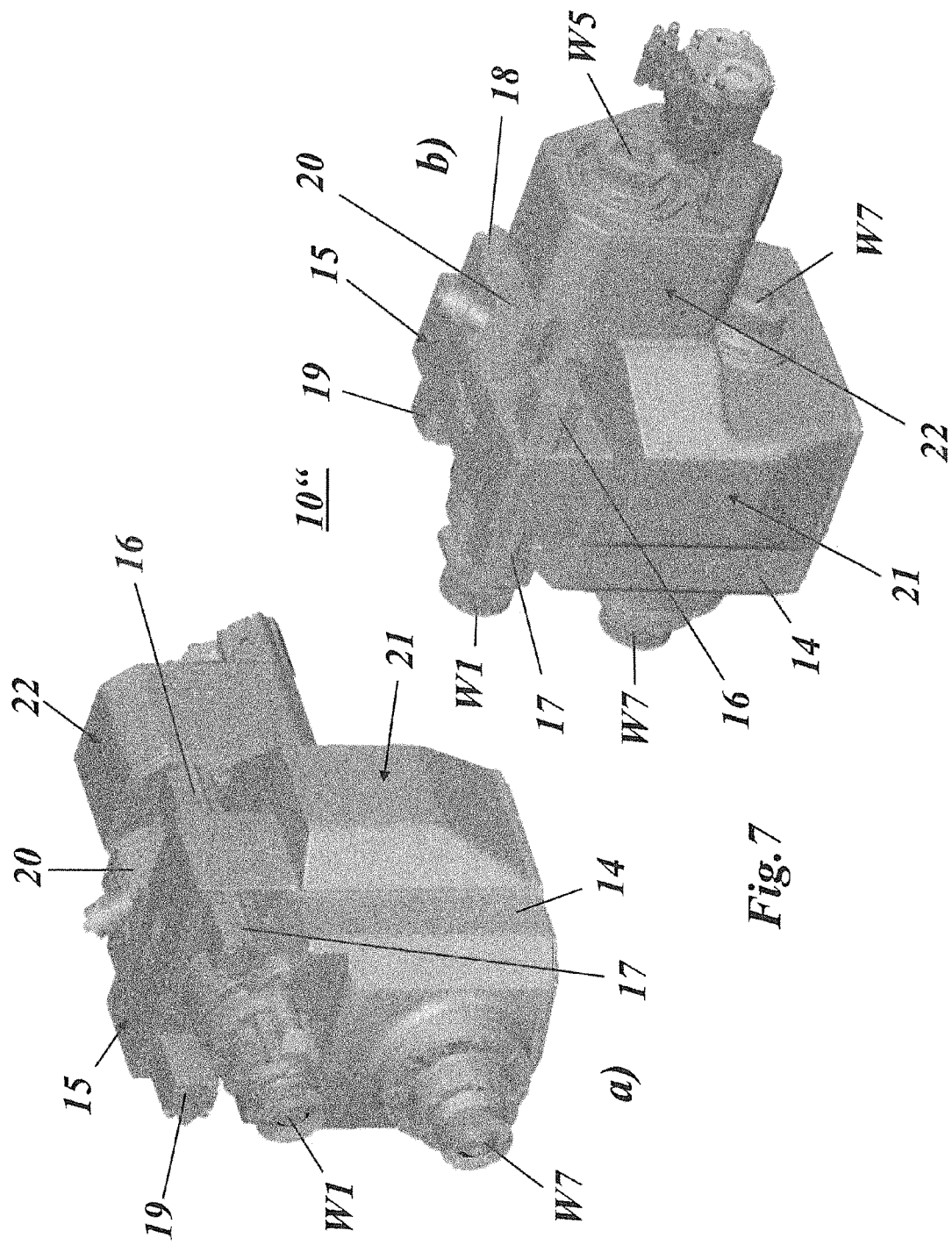
FIG. 7 shows a second complete transmission of the type illustrated in FIG. 1 in a number of views.

The simple and compact construction of the transmission according to the invention also makes it possible to arrange the drive-output shaft W7 in some other position in order to accommodate the different requirements of various vehicles. FIG. 7 shows a transmission 10" in which the drive-input shaft W1 is passed out of the rear side as a power takeoff shaft W5 with an attached power takeoff 22 and in which the drive-output shaft W7 for driving the rear and front axles is relocated considerably further down. If required, however, this shaft can also be relocated to the side.

The internal construction of the transmission 10" in FIG. 7 is reproduced in an exploded perspective view in FIG. 7a. Here, the housing 14 has been modified slightly as compared with FIG. 7. The planetary drive 12, the hydrostatic units H1 and H2, which can be pivoted horizontally about two vertical pivot axes 27 and 28, and other transmission components are arranged in a central block. Also visible are the pistons 29 of the hydraulic cylinders 16, ..., 19 of the adjusting unit 15, said pistons interacting in pairs and being operatively connected to the pivot axes 27 and 28 by levers. Visible on the outside of the power takeoff is the electronic controller 26, which is accommodated in a rectangular housing and in which the signals from the various pickups for temperature, pressure and position distributed through the transmission are also collected.

The second hydrostatic unit H2, which is illustrated in FIG. 7b, comprises a one-piece swivel housing 31, in which the cylinder block 34 with the pistons 35 arranged movably therein is rotatably mounted. Bearing journals 32 and 33 are formed integrally on the swivel housing 31 at the top and bottom respectively. The upper bearing journal 32 simultaneously contains the inlet and outlet openings of high-pressure ducts extending within the swivel housing 31 between the upper bearing journal 32 and the bearing surface for the cylinder block 34 formed within the swivel housing 31. The pistons 35 are mounted in such a way as to allow pivoting in all directions in a bearing ring 36 that merges into the shaft W6.

Figure 8:
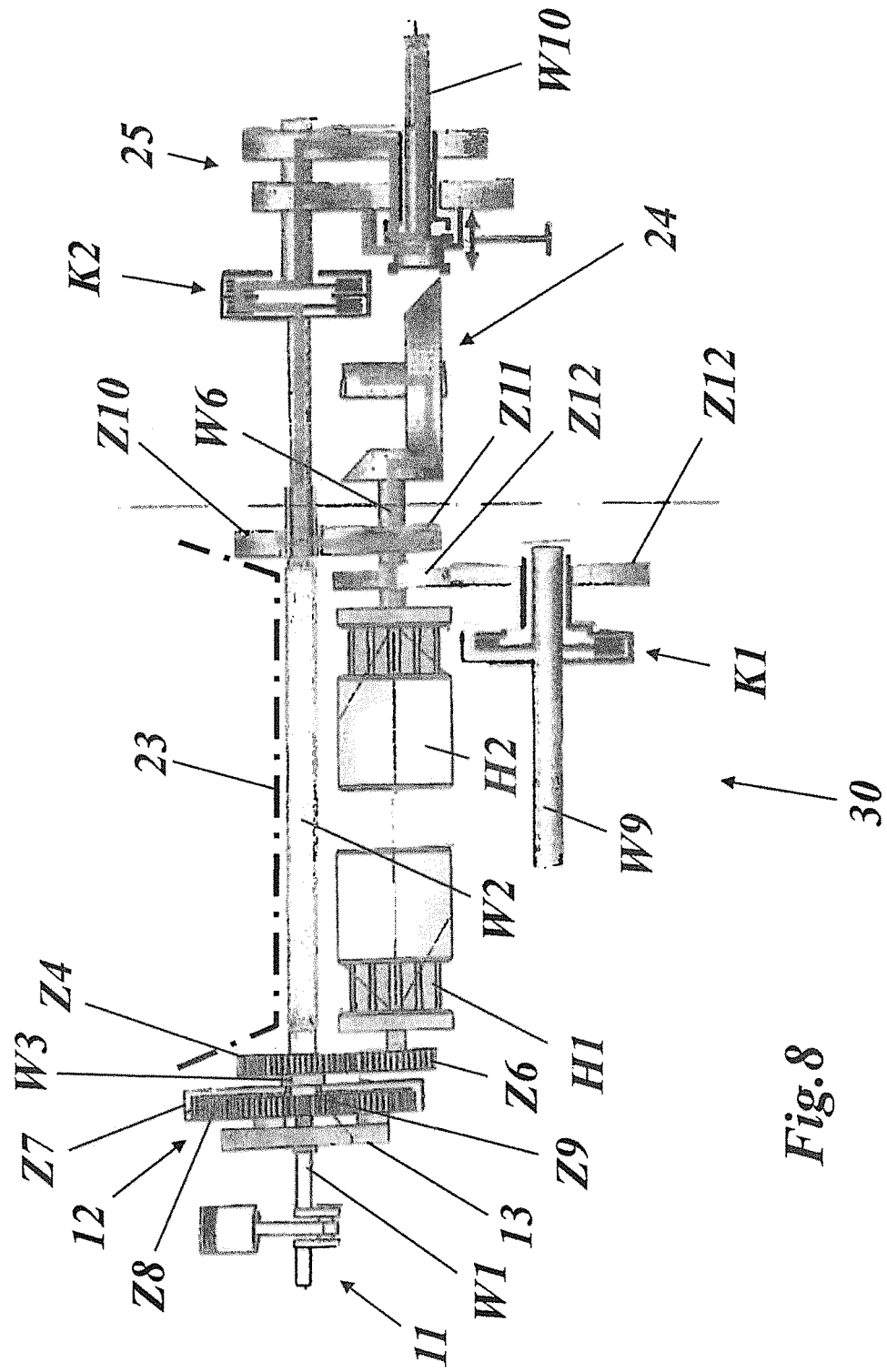
FIG. 8 shows the basic layout of a continuously variable hydrostatic transmission with torque division for small tractors with a lowered cab floor in accordance with a second preferred illustrative embodiment of the invention.

A special embodiment of the transmission according to the invention allows use in small tractors with lowered cab floors, for example. A corresponding transmission layout is reproduced in FIG. 8. The transmission 30 in FIG. 8 is distinguished by the arrangement of the two hydrostatic units H1 and H2 axially in series and as a mirror image of one another. The cylinder blocks of the hydrostatic units H1, H2 are situated opposite one another. The planetary drive 12 and the summing shaft W6 are far apart in the axial direction. The shaft W2 from the sun wheel Z9 to the summing shaft W6, said shaft W2 being embodied as a hollow shaft, extends rearward past the two hydrostatic units H1, H2, above said hydrostatic units H1, H2, and is coupled to the summing shaft W6 by gearwheels Z10 and Z11. As a result, space is gained above for a lowered cab floor 23, which is indicated in FIG. 8 by a chain-dotted line. In this case, the rear axle 24 is driven by the summing shaft W6 via a bevel gear mechanism. The drive-input shaft W1 is passed to the rear through the hollow shaft W2 and can there drive a power takeoff shaft W10 when required via a first clutch K2 and a two-stage shift transmission 25. A shaft W9 for a front axle drive that can be selectively engaged is likewise coupled to the summing shaft W6 via a second clutch and gearwheel pair Z11, Z12.

Figure 9:
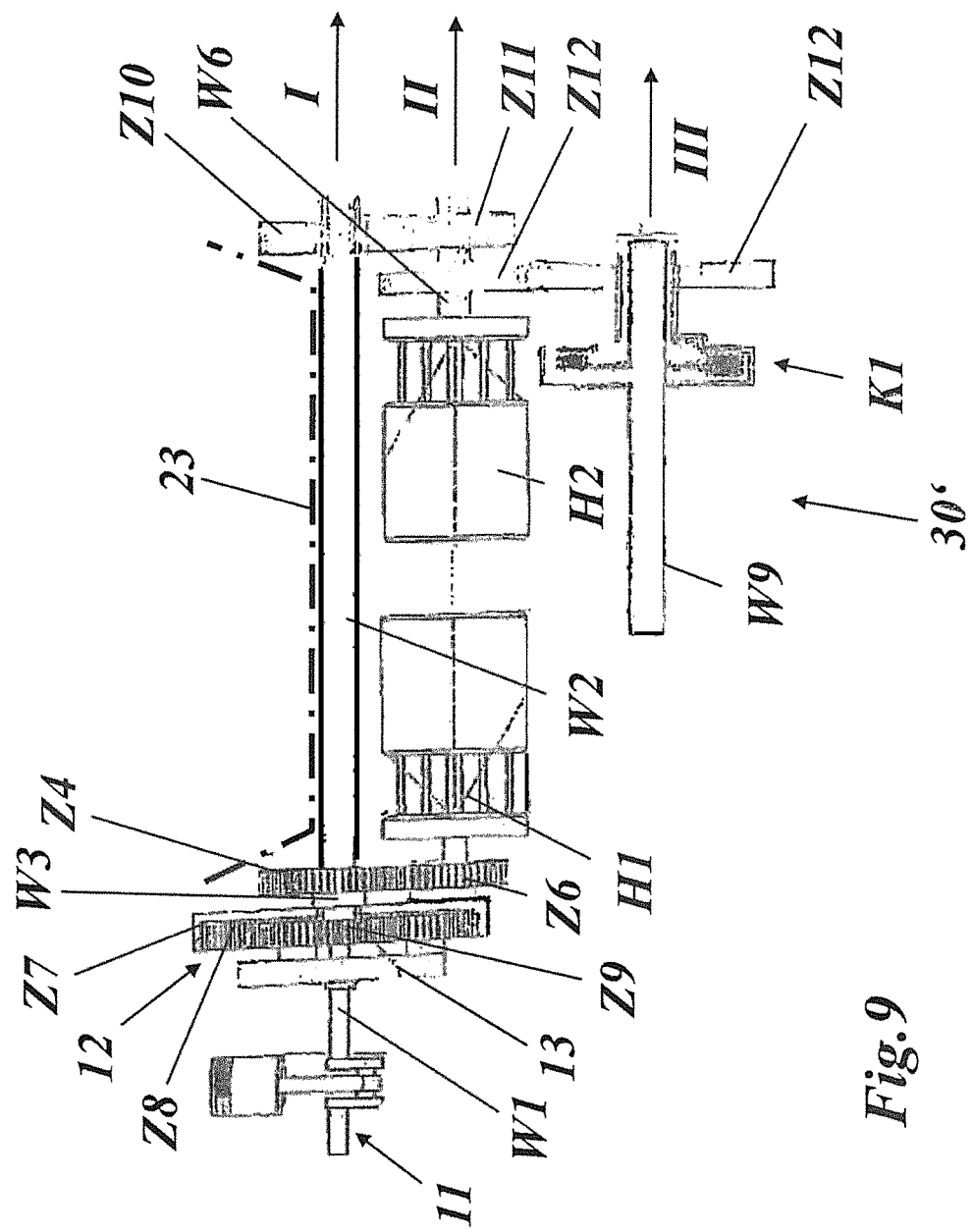
FIG. 9 shows the basic layout of a continuously variable hydrostatic transmission having torque division for small tractors with a lowered cab floor in accordance with FIG. 8 in a modular embodiment.

FIG. 9 shows the modular basic form of the transmission in FIG. 8. With the shafts W2, W6 and W9, the transmission 30' provides three alternative drive output options, which are denoted by arrows and Roman numerals I, II and III in FIG. 9. Once again, the drive-input shaft W1, which is passed through the hollow shaft W2, can also be used as a power takeoff shaft at the other end. Shaft W9, extending away to the left, can be used to drive the front axle in an all-wheel drive system. It is evident that a transmission with this construction can be adapted flexibly to a very wide variety of applications, takes up little space and can be used to advantage especially on narrow small tractors with low cab floors of the kind used in viticulture, for example.

A simple planetary drive acts as a torque-split transmission and is regarded as an optimum solution for the basic construction. The hydrostatic power range employing the large-angle system and pivoting ranges of +/−45° is regarded as the best system in respect of efficiency and ratio spread. If this mechanical basic construction is used and it is combined with the large-angle system and supplemented, if required, with a power takeoff shaft and all-wheel drive, a reasonably priced transmission concept is obtained that can meet the requirements of many vehicle applications.

Overall, the transmission according to the invention is distinguished by the following characteristic features and advantages:

Modular principle
Hydrostatic torque division
Simple planetary drive for torque division
1 forward and 1 reverse drive range
2 large-angle hydrostatic units, +/−45° pivoting angle
Continuously variable power transmission over the entire operating range
High overall efficiency without dips
Full hydrostatic power required only when starting
Full tractive effort always available when starting
No drive clutch required; function available
Speeds of up to 50 km/h possible (up to 65 km/h in special cases)
Lower speeds with reduced engine speed possible
Output speed of between 0 and ≈4000 rpm, controllable
Torque spread, input to output, 1 to ≈5.9
Various driving strategies possible
Control by means of adjusting unit
Continued working with mechanical emergency operation possible in the event of a fault in the electrical or electronic system

The invention claimed is:

1. A continuously variable hydrostatic transmission (10, 10', 10''; 30, 30') having torque division for a vehicle, the transmission (10, 10', 10''; 30, 30') comprising:
a first hydrostatic unit (H1) operating as a pump and a second hydrostatic unit (H2) operating as a motor;
a planetary drive (12), a first shaft (W1) on a drive-input side and a summing means (W6), wherein the power present at the first shaft (W1) is divided by way of the planetary drive (12) between a mechanical transmission branch (Z9, W2, Z1, Z2 or Z10) and a hydraulic transmission branch (Z7, W3, Z4, Z5, Z6, H1, H2 or Z7, W3, Z4, Z6, H1, H2) formed by the two hydraulically coupled hydrostatic units (H1, H2) and is combined again at the summing means (W6), wherein power transmission between the first shaft (W1) and the summing means (W6) can be controlled exclusively by varying the displacements of the hydrostatic units (H1, H2).

2. The continuously variable hydrostatic transmission as claimed in claim 1, wherein the displacements of the two hydrostatic units (H1, H2) can be varied by means of a pivoting process, and in that the two hydrostatic units (H1, H2) are large-angle hydrostatic units with a pivoting range of at least approximately 45°.

3. The continuously variable hydrostatic transmission as claimed in claim 2, wherein the second hydrostatic unit (H2) is pivotable to at least one side by at least approximately 45°, and in that the first hydrostatic unit (H1) is pivotable to one side by at least approximately 45° and to the other side by at least approximately 30°.

4. The continuously variable hydrostatic transmission as claimed in claim 2, wherein the hydrostatic units (H1, H2) are axial-piston oblique-axis hydrostatic units.

5. The continuously variable hydrostatic transmission as claimed in claim 4, wherein the second hydrostatic unit (H2) has a significantly larger maximum displacement than the first hydrostatic unit (H1).

6. The continuously variable hydrostatic transmission as claimed in claim 5, wherein the maximum displacement of the second hydrostatic unit (H2) is approximately twice the maximum displacement of the first hydrostatic unit (H1).

7. The continuously variable hydrostatic transmission as claimed in claim 5, wherein the maximum displacement of the first hydrostatic unit (H1) is approximately 160 cm$^3$.

8. The continuously variable hydrostatic transmission as claimed in claim 1, wherein the summing means is a summing shaft (W6).

9. The continuously variable hydrostatic transmission as claimed in claim 1, wherein the hydrostatic units (H1, H2) are arranged parallel to one another and to the first shaft (W1).

10. The continuously variable hydrostatic transmission as claimed in claim 9, wherein the two hydrostatic units (H1, H2) are arranged adjacent to one another in relation to the direction of the first shaft (WI), in a horizontal plane.

11. The continuously variable hydrostatic transmission as claimed in claim 9, wherein the two hydrostatic units (H1, H2) are arranged coaxially in series and as a mirror image of one another in relation to the direction of the first shaft (W1) wherein the planetary drive (12) is arranged ahead of the two hydrostatic units (H1, H2) in the axial direction, and the summing means (W6) is arranged after the two hydrostatic units (H1, H2) in the axial direction, and wherein the planetary drive (12) and the summing means (W6) are operatively connected by a shaft (W2) extending in the axial direction above the two hydrostatic units (H1, H2).

12. The continuously variable hydrostatic transmission as claimed in claim 1, wherein the planetary drive (12) comprises a central sun wheel (Z9) and an annulus (Z7) concentrically surrounding the sun wheel (Z9) and further comprises planet wheels (Z8) arranged between said sun wheel and annulus and rotatably mounted on a planet spider (13), wherein the planet spider (13) is connected to the first shaft (W1) for conjoint rotation, wherein the annulus (Z7) is operatively connected to the first hydrostatic unit (H1), and in that the sun wheel (Z9) is operatively connected to the second hydrostatic unit (H2).

13. The continuously variable hydrostatic transmission as claimed in claim 1, wherein the first shaft (W1) extends through the planetary drive (12) and comprises a power take-off shaft (W5) on the opposite side from the drive input.

14. The continuously variable hydrostatic transmission as claimed in claim 1, wherein the summing means (W6) is operatively connected to a second shaft (W7, W9) for driving at least one of a rear axle and a front axle.

15. The continuously variable hydrostatic transmission as claimed in claim 14, wherein the drive for the front axle is selectively engageable by way of a clutch (K1).

16. A method for operating a continuously variable hydrostatic transmission as claimed in claim 1, wherein, to implement a continuously variable forward drive range, the displacement of the first hydrostatic unit (H1) is set to zero and the displacement of the second hydrostatic unit (H2) is set to a maximum before starting, in that, in an initial phase, the displacement of the second hydrostatic unit (H2) is held at the maximum and the displacement of the first hydrostatic unit (H1) is increased in the direction of forward travel until it reaches its maximum in the direction of forward travel, and in that, in a second phase, the displacement of the first hydrostatic unit (H1) is held at the maximum and the displacement of the second hydrostatic unit (H2) is reduced from the maximum to zero.

17. The method as claimed in claim 16, wherein, to implement a continuously variable reverse drive range, the displacement of the first hydrostatic unit (H1) is first of all set to zero and the displacement of the second hydrostatic unit (H2) is set to the maximum before starting, in that, in an initial phase, the displacement of the second hydrostatic unit (H2) is held at the maximum and the displacement of the first hydrostatic unit (H1) is increased in the direction of reverse travel until it reaches its maximum in the direction of reverse travel, and in that, in a second phase, the displacement of the first hydrostatic unit (H1) is held at the maximum and the displacement of the second hydrostatic unit (H2) is reduced from the maximum to zero.

\* \* \* \* \*